(12) United States Patent
Pickering

(10) Patent No.: US 6,631,929 B1
(45) Date of Patent: Oct. 14, 2003

(54) CONNECTION CARTRIDGE FOR AIR TANKS

(75) Inventor: Richard C. Pickering, Urbana, OH (US)

(73) Assignee: Q3JMC, Incorporated, Urbana, OH (US)

(*) Notice: Subject to any disclaimer, the term of this patent is extended or adjusted under 35 U.S.C. 154(b) by 0 days.

(21) Appl. No.: 09/857,977

(22) PCT Filed: Dec. 10, 1999

(86) PCT No.: PCT/US99/29283

§ 371 (c)(1),
(2), (4) Date: Aug. 2, 2001

(87) PCT Pub. No.: WO00/34092

PCT Pub. Date: Jun. 15, 2000

Related U.S. Application Data (60) Provisional application No. 60/111,830, filed on Dec. 11, 1998.

(51) Int. Cl.[7] ................................................. F16L 39/00
(52) U.S. Cl. ........................ 285/321; 285/305; 285/921
(58) Field of Search ................................ 285/305, 321, 285/921

(56) References Cited

U.S. PATENT DOCUMENTS

| | | | |
|---|---|---|---|
| 2,570,909 A | * 10/1951 | Benson et al. | 251/144 |
| 3,540,760 A | 11/1970 | Miller et al. | |
| 3,953,555 A | 4/1976 | Gley | |
| 4,600,221 A | * 7/1986 | Bimba | 285/91 |
| 4,872,710 A | 10/1989 | Konecny et al. | |
| 5,096,235 A | * 3/1992 | Oetiker | 285/308 |
| 5,163,712 A | * 11/1992 | Sabo et al. | 285/7 |
| 5,230,539 A | 7/1993 | Olson | |
| 5,429,394 A | 7/1995 | Olson | |
| 5,505,501 A | 4/1996 | Seabra | |
| 5,516,077 A | 5/1996 | Roberts | |
| 5,573,281 A | 11/1996 | Keller | |
| 5,607,190 A | 3/1997 | Exandier et al. | |
| 5,636,662 A | 6/1997 | Olson | |
| 5,681,060 A | 10/1997 | Berg et al. | |
| 5,681,061 A | 10/1997 | Olson | |
| 5,718,459 A | 2/1998 | Davie et al. | |
| 6,113,151 A | * 9/2000 | Beans | 285/23 |

FOREIGN PATENT DOCUMENTS

| | | | |
|---|---|---|---|
| GB | 1172404 | 11/1969 | |
| WO | Wo 94/07076 | * 3/1994 | 285/321 |

* cited by examiner

Primary Examiner—Lynne H. Browne
Assistant Examiner—James M. Hewitt
(74) Attorney, Agent, or Firm—Schniff Hardin & Waite (57) ABSTRACT

A cartridge concentrically received within a bushing fixed to the end wall of an air reservoir tank. The bushing includes a retaining groove for receiving a snap ring engageable with a retaining surface on the cartridge, thereby securing the cartridge within the end wall of the tank. The cartridge includes a fluid passageway which may be provided with a plurality of components, including push-to-connect tube or hose fittings, inlet check valves, pressure relief valves, or the like, by which the cartridge provides for communication with the interior of the air reservoir tank.

14 Claims, 6 Drawing Sheets

CONNECTION CARTRIDGE FOR AIR TANKS

CROSS-REFERENCE TO RELATED APPLICATIONS

Priority filing benefit of (1) International PCT application PCT/US99/29283 filed Dec. 10, 1999, and published under PCT 21(2) in the English language and (2) U.S. provisional application Ser. No. 60/111,830 filed Dec. 11, 1998.

BACKGROUND OF THE INVENTION

1. Field of the Invention

The present invention relates to cartridges for sealingly connecting fluid devices to a pressure vessel and, more particularly, to a quick connection cartridge for connecting vehicle brake lines, fittings and valves to an air reservoir tank.

2. Description of the Prior Art

Air reservoir tanks are commonly used in vehicles to supply air to air-pressure operated components. For example, trucks or semi-trailers often utilize flexible pneumatic air lines to deliver air under pressure for braking functions and for operating auxiliary pneumatic devices. Reliable transmission of air pressure and the connection of pneumatic air lines to an air reservoir tank can be problematic.

Commonly, fittings on air reservoir tanks have been made by punching or forming a hole in the wall of the tank and welding a threaded bushing at the hole, having internal NPT-type pipe threads. The connector or device to be mounted or supported has corresponding external NPT interference-fit threads connected to communicate with the tank interior. Such arrangements have led to persistent leakage problems since NPT-type threads do not reliably hold air pressure, particularly where the working pressures may run as high as 150 psi. Such leakage problems have resulted in the need for the application of sealants to the threads resulting in additional expense and assembly time.

Additionally, traditional threaded connections necessarily result in the deformation of the threads of the bushing and connector or device. Such deformation aggravates the leakage problem particularly when the connector or device is interchanged with a different connector or device. Additionally, since the angular orientation of the connector or device mounted within the bushing determines the interference and resulting seal between the threads, reorientation of the connector or device is usually not possible. Traditional threaded connections therefore provide little flexibility in positioning of the connector or device supported by the bushing.

In recognition of the above noted problems with conventional threaded connections, quick connect cartridges have been proposed as a substitute therefor. Such quick connect cartridges typically include outer brass rings or fingers which create a mechanical interference between the cartridge and the receiving bushing. However, these quick connect cartridges often suffer from the drawback of being difficult to insert within the bushing resulting in increased assembly time and expense. Additionally, traditional quick connect cartridges are often deformed after prolonged use, thereby preventing their interchangeable reuse within various bushings. Finally, connection cartridges are required to have very high pull-off forces, particularly in the application of connecting brake lines to an air reservoir tank in a vehicle. Because traditional quick connect cartridges typically lack the required high pull-off forces, they are often unacceptable for connecting such brake lines.

Accordingly, there is a need for a connection cartridge for sealingly connecting fluid devices to an air tank which eliminates threaded connections and, at the same time, is easily replaceable while permitting angular reorientation of the device connected thereto.

SUMMARY OF THE INVENTION

The connection cartridge for air tanks, according to the present invention, is designed to be used in metal tanks, such as steel or aluminum, or may also be used on composite-wound air tanks, such as for heavy duty air systems for truck air brakes and the like. The common maximum working pressure for such reservoirs is 150 pounds per square inch gauge (psig). The connection cartridge of this invention is designed to receive a multitude of fluid devices. More particularly, the cartridge may be used as both a housing for coupling devices for connecting air lines, and as a housing for valves which are typically found in truck air brake reservoirs, including one way check valves, pressure protection valves, drain valves, pressure relief valves, and the like.

The cartridge of the present invention is sealingly received within a bushing fixed to a domed end wall of an air reservoir tank. The bushing includes a cylindrical body having a receiving bore extending between opposing proximal and distal ends. An annular retaining groove is provided proximate the distal end of the cylindrical body while an annular bearing surface is positioned between the retaining groove and the proximal end.

A cartridge is slidably and concentrically received within the receiving bore of the bushing and includes a passageway extending between opposing inlet and outlet ends. An engagement shoulder is positioned proximate the outlet end for engaging the annular bearing surface of the bushing, thereby preventing axial movement of the cartridge inwardly in a proximal direction toward the interior of the air reservoir tank. An annular O-ring receiving recess is positioned between the engagement shoulder and the inlet end of the cartridge. An O-ring is received within the annular O-ring receiving recess for providing sealing engagement between the bushing and the cartridge. A snap ring is received within the annular retaining groove of the bushing and is engagable with a distally facing retaining surface of the cartridge, thereby preventing movement of the cartridge outwardly in a distal direction away from the interior of the air reservoir tank.

The passageway of the cartridge is adapted to sealingly receive a fluid device. Such fluid devices may comprise push-to-connect fittings, check valves, pressure relief valves, and the like.

It is accordingly an object of the present invention to provide a connection cartridge for receiving a fitting or valve for communicating with an air reservoir tank of an air brake system which eliminates threaded connections between the cartridge and the tank.

A further object of the present invention is to provide such a cartridge which substantially eliminates leakage between the air reservoir tank and the fitting or valve.

Another object of the present invention is to provide a cartridge which is easily installed thereby reducing assembly time.

It is a further object of the present invention to provide such a cartridge which eliminates the need for sealants.

It is yet another object of the present invention to provide such a cartridge for receiving a push-to-connect fitting which permits communication between the air reservoir tank and brake lines, and which further permits the free rotation of the fitting and brake line relative to the tank.

A further object of the invention is to provide a cartridge received within an air reservoir tank which is easily serviceable and replaceable.

Other objects and advantages of the invention will be apparent from the following description and the accompanying drawings.

DETAILED DESCRIPTION OF THE PREFERRED EMBODIMENT

Figure 1:
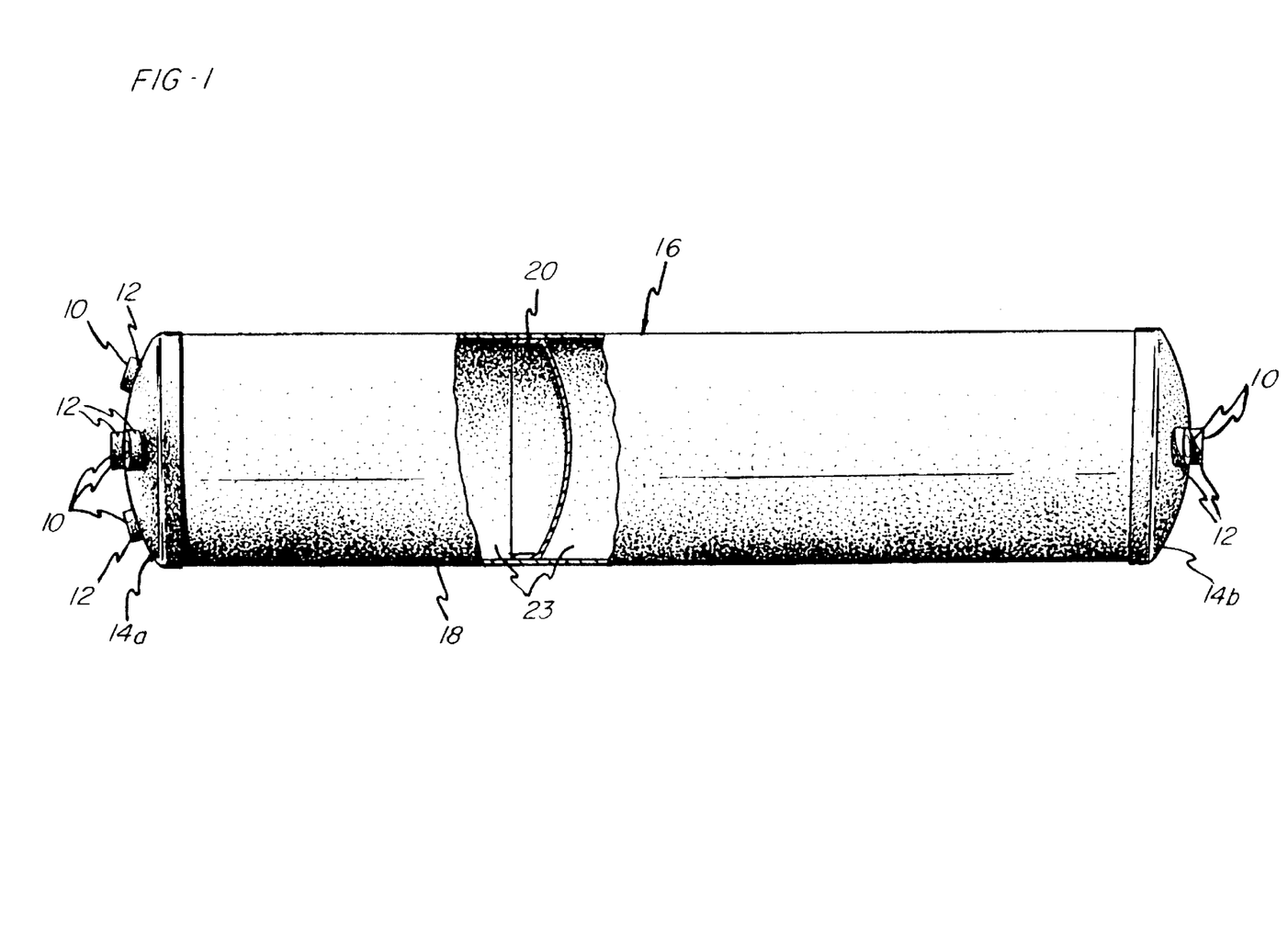
FIG. 1 is a side elevational view of a dual-chamber air pressure tank of the type used for trucks in which a plurality of cartridges, according to this invention, are mounted within each of the domed ends of the tank.
Figure 2:
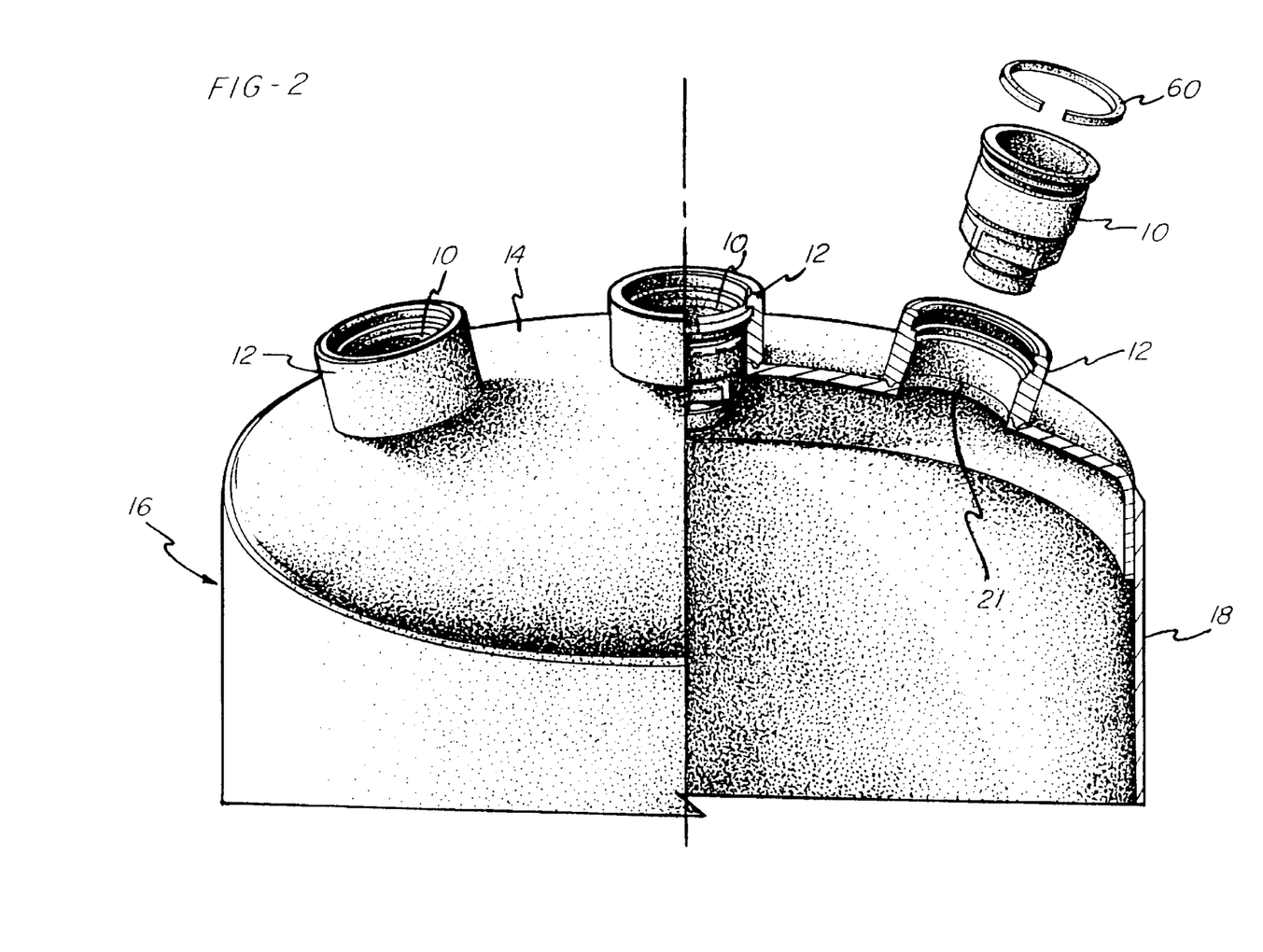
FIG. 2 is a perspective view with a partial cut-away of an end of the air pressure tank of FIG. 1 in which a cartridge and retaining device are shown removed from the bushing.

Referring initially to FIGS. 1 and 2 of the drawings, a cartridge made in accordance with the present invention is shown generally at 10. The cartridge 10 is mounted within a bushing 12 fixed to a domed end cap 14 of a cylindrical air reservoir tank 16. In FIG. 1, a dual-chamber tank 16 is illustrated with a cylindrical body or shell 18 extending between opposing domed end caps 14a and 14b. In this case, the tank 16 includes an internal partition 20 which effectively divides the tank 16 into two separate reservoir sections. Each bushing 12 is concentrically aligned with an opening 21 formed within the domed end cap 14 wherein the openings 21 provide fluid communication with the interior 23 the tank 16 (FIGS. 2 and 3).

Figure 3:
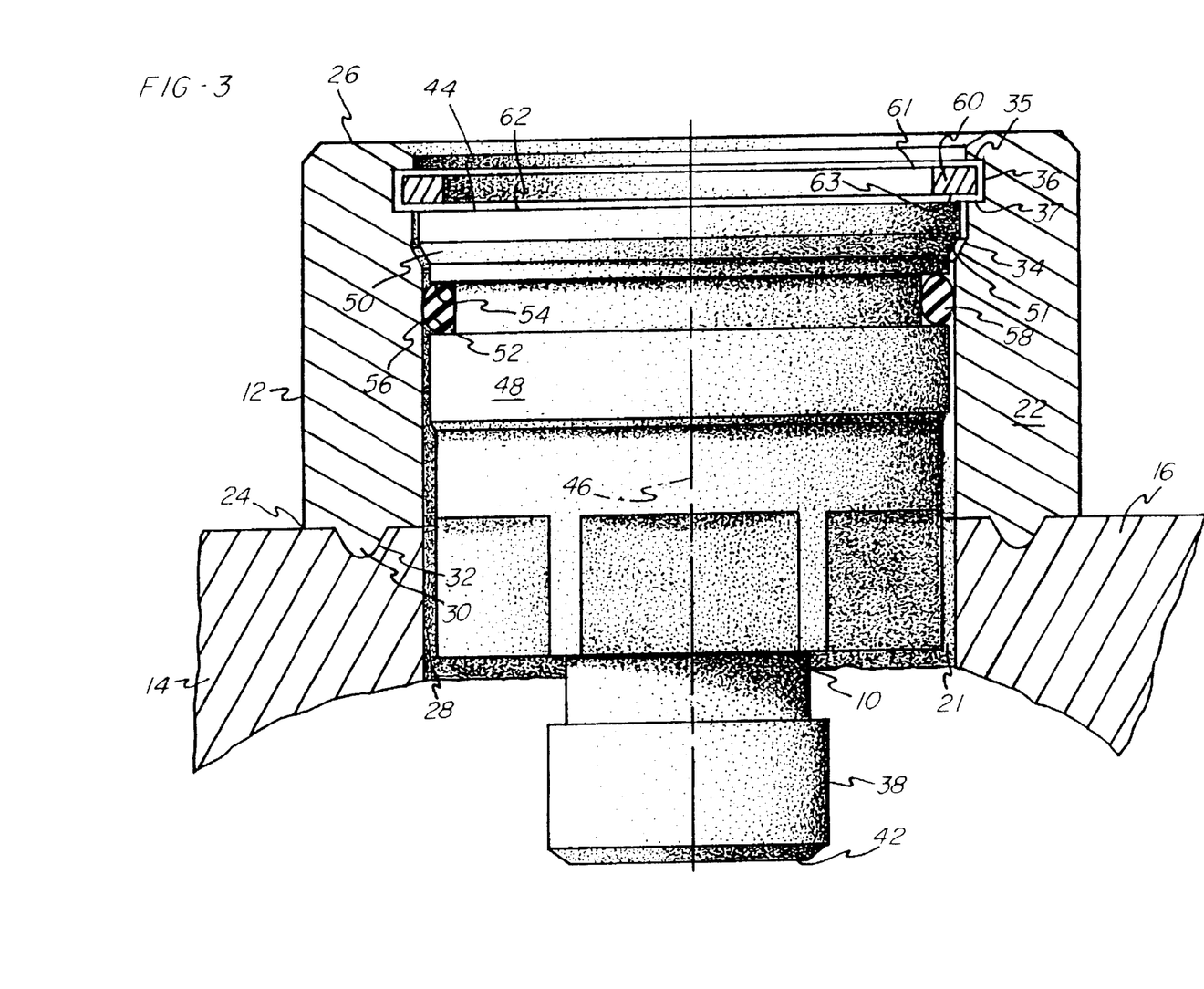
FIG. 3 is a side elevational view of the cartridge of the present invention installed within the bushing shown in cross section.
Figure 4:
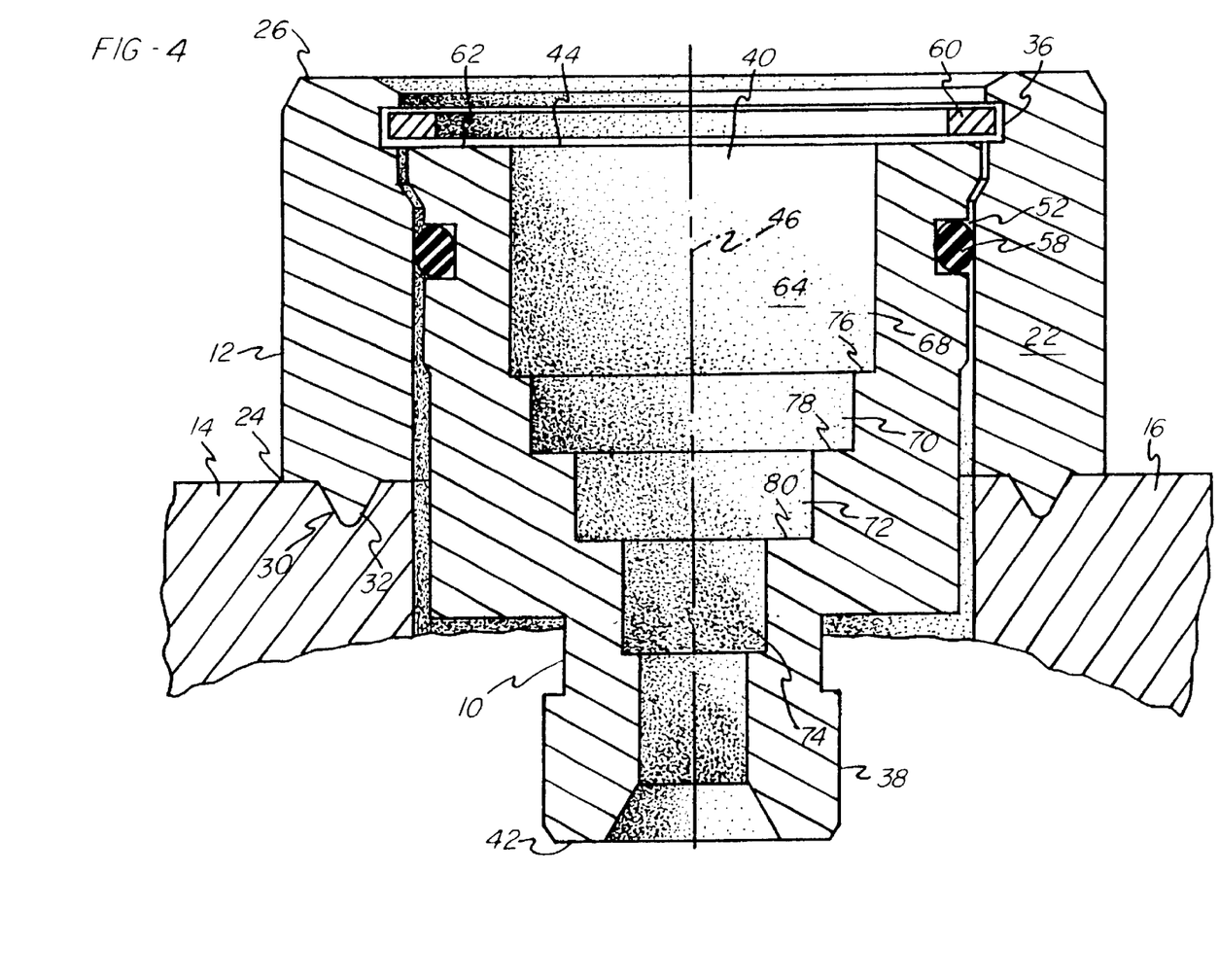
FIG. 4 is a cross sectional view of a cartridge of the present invention adapted for receiving a push-to-connect fitting.

Turning now to FIGS. 3 and 4, the bushing 12 includes a cylindrical body 22 defining opposing proximal and distal ends 24 and 26. A cylindrical receiving bore 28 is concentrically received within the body 22 and extends between the proximal and distal ends 24 and 26. The proximal end 24 of the bushing is fixed to the domed end wall 14 of the air reservoir tank 16. An annular locating projection 30 extends axially outwardly from the proximal end 24 of the bushing 12. The locating projection 30 mates with an annular receiving groove 32 formed within the domed end wall 14 of the air reservoir tank 16. Once the locating projection 30 of the bushing 12 is seated within the receiving groove 32, the bushing 12 is fixed in place, preferably through welding. The bushing 12 is manufactured from a projection weldable material, preferably carbon steel.

An annular bearing surface 34 is concentrically formed around the receiving bore 28 adjacent to the distal end 26 of the bushing 12. The annular bearing surface 34 extends substantially radially within the body 22 and faces toward the distal end 26. The receiving bore 28 has an enlarged diameter between the distal end 26 and the bearing surface 34. An annular retaining groove 36 is concentrically formed within the body 22 of the bushing 12 between the bearing surface 34 and the distal end 26 and extends radially outwardly within the body 22. The retaining groove 36 is defined by a proximally facing first surface 35 and a distally facing second surface 37.

Referring further to FIGS. 2–4, the cartridge 10 of the present invention comprises a cylindrical body 38 preferably molded from a nylon-6 material. A cylindrical passageway 40 extends through the body 38 between inlet and outlet ends 42 and 44 and is concentrically disposed around a longitudinal axis 46 (FIG. 4). The cartridge 10 is slidably received within the receiving bore 28 of the bushing 12. The inlet and outlet ends 42 and 44 of the cartridge 10 are positioned adjacent the proximal and distal ends 24 and 26 of the bushing 12, respectively.

The outer surface 48 of the body 38 defines an annular engagement shoulder 50 having a contact surface 51 facing towards the inlet end 42 for positioning in engagement with the annular bearing surface 34 of the bushing 12 (FIG. 3). Engagement between the contact surface 51 of the shoulder 50 and the bearing surface 34 prevents axial movement of the cartridge 10 in a proximal direction along the longitudinal axis 46 towards the interior 23 of the air reservoir tank 16. An annular receiving recess 52 extends radially inwardly within the body 38 between first and second shoulders 54 and 56 positioned between the engagement shoulder 50 and the inlet end 42 (FIG. 4). An O-ring 58 is received within the recess 52 between the first and second surfaces 54 and 56 and is compressed between the bushing 12 and the cartridge 10. The O-ring 58 provides sealing engagement between the cartridge 10 and the bushing 12 to prevent fluid flow therebetween.

A retaining device, preferably an annular snap ring 60, is received within the annular retaining groove 36 of the bushing 12. The snap ring 60 is engagable with a radially outwardly extending annular retaining surface 62 adjacent to, and facing towards, the outlet end 44 of the cartridge 10. Engagement between the snap ring 60 and the retaining surface 62 prevents axial movement of the cartridge 10 in a distal direction away from the interior 23 of the air reservoir tank 16 along the longitudinal axis 46. More particularly, the snap ring 60 includes opposing first and second faces 61 and 63 which are directed towards the distal and proximal ends 26 and 24 of the bushing 12, respectively. The faces 61 and 63 are respectively engagable with the first surface 35 of the retaining groove 36 and the retaining surface 62.

It should be appreciated that the interior surface 64 of the cartridge 10 defining the fluid passageway 40 may be customized in order to receive a variety of components, including fittings and valves. Referring further to FIG. 4, a cross sectional view of a first embodiment of cartridge 10 illustrates a fluid passageway 40 adapted to receive a push-to-connect internal coupling for receiving and supporting a flexible air line (not shown). More particularly, the fluid passageway 40 includes first, second, third and fourth concentric stepped bore portions 68, 70, 72 and 74 defining intermediate shoulders 76, 78 and 80 therebetween. The internal coupling adapted to mate with the bore portions 68, 70, 72 and 74 and shoulders 76, 78 and 80 may be made in accordance with the teachings of U.S. Pat. No. 5,230,539 issued Jul. 27, 1993, incorporated herein by reference and offered by the Dana Corporation of Toledo, Ohio as Part No. 117-02200-TAB.

Figure 5:
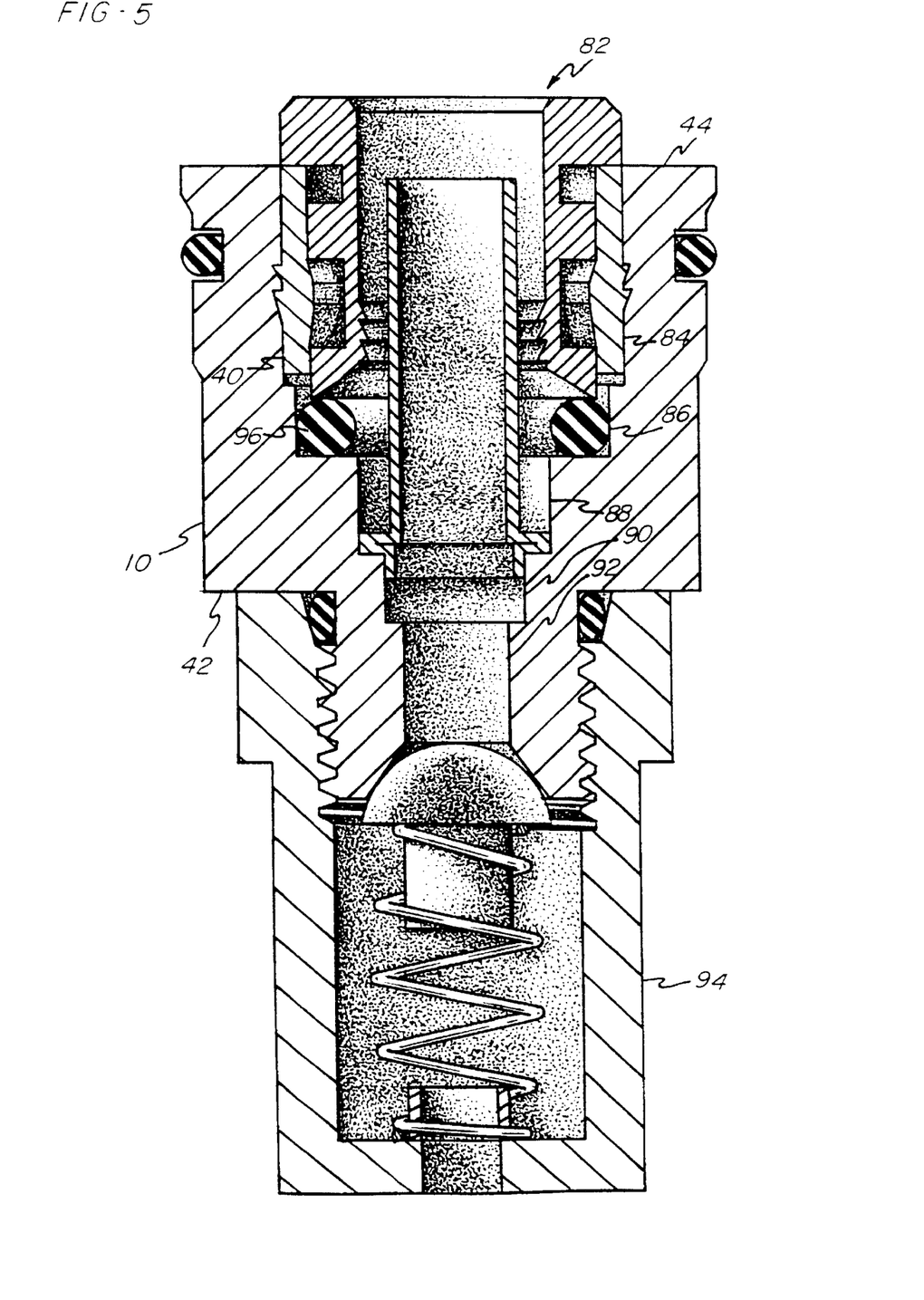
FIG. 5 is a cross sectional view of a cartridge of the present invention including a check valve assembly.

Turning now to FIG. 5, a second embodiment of the cartridge 10 of the present invention includes a fluid passageway 40 adapted to receive a check valve assembly 82 therein by means of which air under pressure may be applied to the interior 23 of the tank 16 and then retained under pressure. The passageway 40 includes concentric step bore portions 84, 86, 88, 90 and 92 for mating with the check valve assembly 82. The check valve assembly 82 is retained within the cartridge 10 by a housing 94 threadably received on the inlet end 42 of the cartridge 10. An O-ring 96 is received between the housing 94 and the cartridge 10 to provide a seal therebetween. The check valve assembly 82 may comprise Part No. SK-J2058 available from $Q_3$ JMC, Inc. of Urbana, Ohio.

Figure 6:
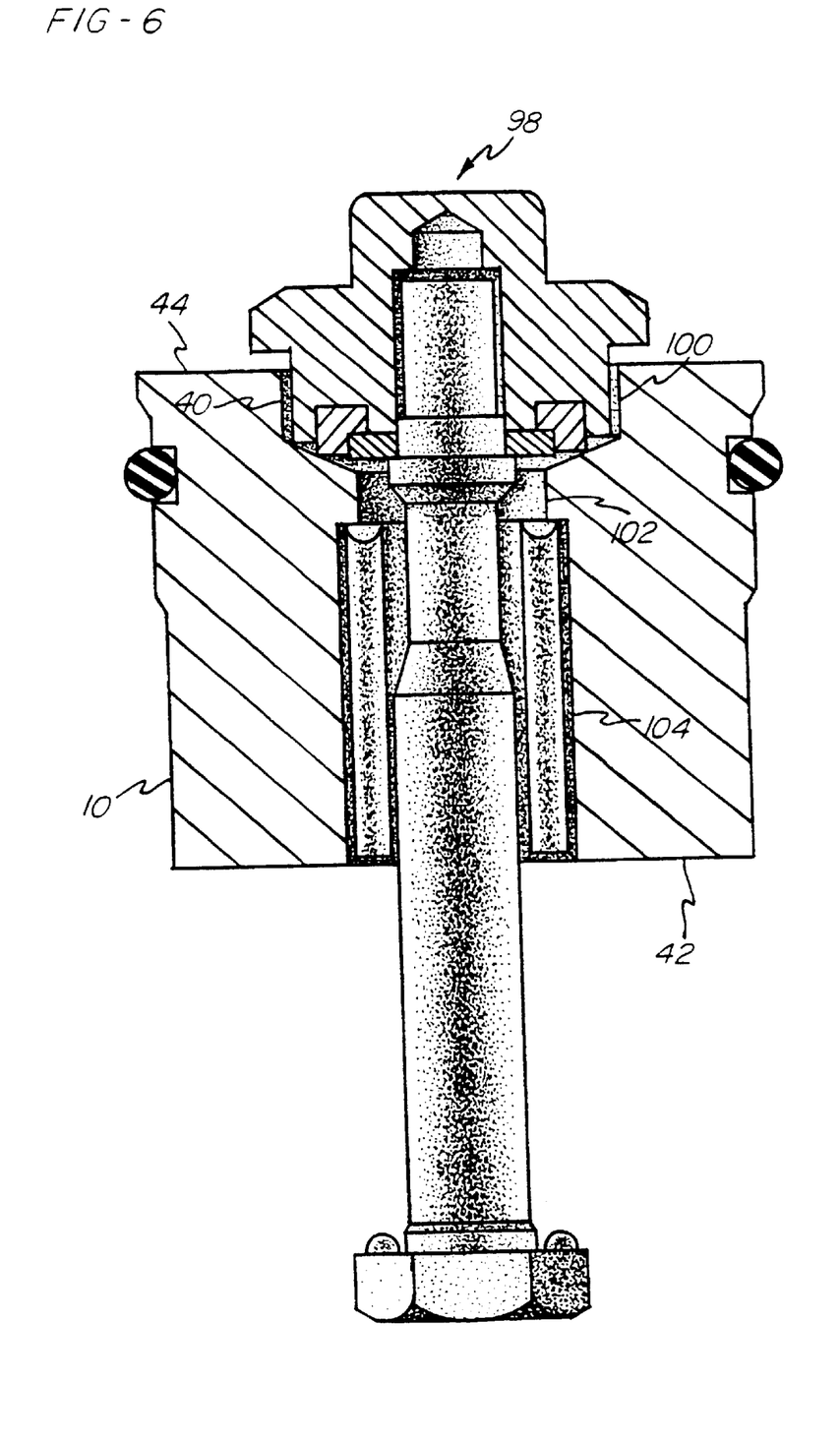
FIG. 6 is a cross sectional view of a cartridge of the present invention including a pressure relief valve.

Turning now to FIG. 6, a third embodiment of the cartridge 10 of the present invention includes a fluid passageway 40 adapted to receive a pressure relief valve 98. The passageway 40 in such an embodiment includes concentric bore portions 100, 102 and 104 for receiving a pressure relief valve 98. The pressure relief valve 98 releases air when a certain pressure within the interior 23 of the air reservoir tank 16 is reached. Such a pressure relief valve 98 may be Part No. 401123 as available from Sloane Transportation Products of Holland, Mich.

It will therefore be seen that the cartridge of the present invention provides for a flexible, convenient and simple attachment of various components to an air reservoir tank. Further, the cartridge provides for simple replacement thereof without damaging the tank thereby greatly reducing the chances of leakage.

While the forms of apparatus herein described constitute preferred embodiments of this invention, it is to be understood that the invention is not limited to these precise forms of apparatus, and that changes may be made therein without departing from the scope of the invention.

What is claimed is:

1. A connection cartridge assembly adapted to be fitted to the domed end cap of an air reservoir tank in a vehicle, said cap supporting an outwardly extending bushing defining a receiving bore concentrically receiving said connection cartridge assembly for providing fluid communication with an interior of said reservoir tank, said connection cartridge assembly comprising:

a cylindrical body including opposing inlet and outlet ends, a fluid passageway extending between said opposing inlet and outlet ends and defining a longitudinal axis, said passageway formed by a plurality of concentric stepped bore portions defining a plurality of shoulders for cooperating with a fluid control device, an annular engagement shoulder having a contact surface facing towards said inlet end and adapted to contact an inner surface of said receiving bore of said bushing for preventing axial movement of said cartridge towards said interior of said reservoir tank, an annular receiving recess extending radially inwardly on an outer surface of said body and positioned between said engagement shoulder and said inlet end, and an annular retaining surface extending substantially radially outwardly and defined by said outlet end;

a sealing member received within said receiving recess for providing sealing engagement between said body and said bushing; and a retaining member releasably secured within said bushing, said retaining member including a first face directed towards a distal end of said bushing and engageable with an inner surface of said bushing, and a second face directed towards a proximal end of said bushing and engageable with said retaining surface, said retaining member positioned intermediate said distal end of said bushing and said outlet end of said body, wherein said body is retained within said bushing with said outlet end recessed below said distal end of said bushing in a direction towards said interior of said reservoir tank.

2. The connection cartridge assembly of claim 1 wherein said fluid control device comprises a push-to-connect internal coupling for receiving and supporting a flexible air line.

3. The connection cartridge assembly of claim 1 wherein said fluid control device comprises a check valve assembly.

4. The connection cartridge assembly of claim 1 wherein said fluid control device comprises a pressure relief valve.

5. The connection cartridge assembly of claim 1 wherein said retaining member comprises a snap ring.

6. The connection cartridge assembly of claim 1 wherein said sealing member comprises a resilient o-ring.

7. A connection assembly supported within an air tank, said air tank for supplying a motor vehicle pneumatic system with air under pressure and including a cylindrical body and a domed end cap, said air tank further including an interior chamber and an opening formed in at least one of said body and said end cap, said connection assembly comprising:

a bushing including a cylindrical body concentrically aligned with said opening and supported by said tank, said bushing including a cylindrical body having opposing proximal and distal ends, a receiving bore extending between said proximal and distal ends and including an annular bearing surface extending substantially radially within said body and facing towards said distal end, an annular retaining groove concentrically formed with said receiving bore intermediate said bearing surface and said distal end and extending radially outwardly within said body;

a connection cartridge slidably and concentrically received within said receiving bore of said bushing, said connection cartridge including a cylindrical body with an outer surface having opposing inlet and outlet ends, a fluid passageway extending between said opposing inlet and outlet ends, an annular engagement shoulder having a contact surface facing towards said inlet end and adapted to contact said bearing surface of said receiving bore of said bushing for preventing axial movement of said cartridge towards said interior chamber of said tank, an annular receiving recess extending radially inwardly on an outer surface of said body of said cartridge and positioned between said engagement shoulder and said inlet end, and an annular retaining surface extending substantially radially outwardly, facing towards said outlet end and positioned proximate said outlet end;

a sealing member received within said receiving recess of said cartridge for providing sealing engagement between said cartridge and said bushing;

a retaining member releasably secured within said annular retaining groove of said bushing, said retaining member including a first face directed towards said distal end of said bushing and engagable with an inner surface of said retaining groove of said bushing, and a second face directed toward said proximal end of said bushing and engagable with said retaining surface, said retaining member positioned intermediate said distal end of said bushing and said outlet end of said body wherein said body is retained within said bushing with said outlet end recessed below said distal end of said bushing in a direction towards said interior of said tank;

a fluid control device received within said passageway of said cartridge; and wherein said passageway is formed by a plurality of concentric stepped bore portions defining a plurality of shoulders for cooperating with said fluid control device.

8. The connection assembly of claim 7 wherein said fluid control device comprises a push-to-connect internal coupling for receiving and supporting a flexible air line.

9. The connection assembly of claim 7 wherein said fluid control device comprises a check valve assembly.

10. The connection assembly of claim 7 wherein said fluid control device comprises a pressure relief valve.

11. The connection assembly of claim 7 wherein said retaining member comprises a snap ring.

12. The connection assembly of claim 7 wherein said sealing member comprises a resilient o-ring.

13. The connection assembly of claim 7 wherein said bushing further comprises an annular locating projection supported adjacent said proximal end of said bushing for seating said bushing within a receiving groove formed in said tank.

14. A connection assembly supported within an air tank, said air tank including a cylindrical body, a domed end cap, an interior chamber and an opening formed in at least one of said body and said end cap, said connection assembly comprising:
- a bushing including a cylindrical body concentrically aligned with said opening and supported by said tank, said bushing including a cylindrical body having opposing proximal and distal ends, a receiving bore extending between said proximal and distal ends and including an annular bearing surface extending substantially radially within said body and facing towards said distal end, an annular retaining groove concentrically formed with said receiving bore intermediate said bearing surface and said distal end and extending radially outwardly within said body, and an annular locating projection supported adjacent said proximal end of said bushing for seating said bushing within a receiving groove formed in said tank;
- a connection cartridge slidably and concentrically received within said receiving bore of said bushing, said connection cartridge including a cylindrical body having opposing inlet and outlet ends, a fluid passageway extending between said opposing inlet and outlet ends, an annular engagement shoulder having a contact surface facing towards said inlet end and adapted to contact said bearing surface of said receiving bore of said bushing for preventing axial movement of said cartridge towards said interior chamber of said tank, an annular receiving recess extending radially inwardly on an outer surface of said body of said cartridge and positioned between said engagement shoulder and said inlet end, and an annular retaining surface extending substantially radially outwardly, facing towards said outlet end and positioned proximate said outlet end;
- a resilient o-ring received within said receiving recess of said cartridge for providing sealing engagement between said cartridge and said bushing;
- a snap ring releasably secured within said annular retaining groove of said bushing and engagable with said retaining surface of said cartridge for preventing axial movement of said cartridge in a direction towards said distal end of said bushing, said snap ring including a first face directed towards said distal end of said bushing and engagable with an inner surface of said retaining groove of said bushing and a second face directed toward said proximal end of said bushing and engagable with said retaining surface, said snap ring positioned intermediate said distal end of said bushing and said outlet end of said body of said cartridge wherein said body of said cartridge is retained within said bushing with said outlet end recessed below said distal end of said bushing in a direction towards said interior chamber of said tank;
- a fluid control device received within said passageway of said cartridge; and
- wherein said passageway is formed by a plurality of concentric stepped bore portions defining a plurality of shoulders for cooperating with said fluid control device.

* * * * *